United States Patent
Armaly

(10) Patent No.: US 12,316,910 B2
(45) Date of Patent: *May 27, 2025

(54) SYSTEMS AND METHODS FOR DYNAMICALLY ADJUSTING MEDIA OUTPUT BASED ON PRESENCE DETECTION OF INDIVIDUALS

(71) Applicant: Adeia Guides Inc., San Jose, CA (US)

(72) Inventor: Samir B. Armaly, La Canada Flintridge, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,593

(22) Filed: Aug. 24, 2023

(65) Prior Publication Data
US 2023/0403429 A1 Dec. 14, 2023

Related U.S. Application Data

(63) Continuation of application No. 17/326,842, filed on May 21, 2021, now Pat. No. 11,785,294, which is a continuation of application No. 16/471,091, filed as application No. PCT/US2016/068655 on Dec. 27, 2016, now Pat. No. 11,044,525.

(51) Int. Cl.
| | |
|---|---|
| *H04N 21/45* | (2011.01) |
| *H04N 21/439* | (2011.01) |
| *H04N 21/44* | (2011.01) |
| *H04N 21/442* | (2011.01) |
| *H04N 21/482* | (2011.01) |
| *H04N 21/488* | (2011.01) |

(52) U.S. Cl.
CPC ... *H04N 21/44218* (2013.01); *H04N 21/4394* (2013.01); *H04N 21/44008* (2013.01); *H04N 21/4532* (2013.01); *H04N 21/4821* (2013.01); *H04N 21/4882* (2013.01)

(58) Field of Classification Search
None
See application file for complete search history.

(56) References Cited

U.S. PATENT DOCUMENTS

| | | | |
|---|---|---|---|
| 6,239,794 | B1 | 5/2001 | Yuen et al. |
| 6,564,378 | B1 | 5/2003 | Satterfield et al. |
| 7,134,130 | B1 | 11/2006 | Thomas |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 8,893,169 | B2 | 11/2014 | Klappert et al. |

(Continued)

*Primary Examiner* — William J Kim
(74) *Attorney, Agent, or Firm* — Haley Guiliano LLP

(57) ABSTRACT

Systems and methods are disclosed herein for detecting a presence of a second user inside an aural range of the video but outside of a visual range of the display device, determining that a profile of the second user indicates a conflict for the second user with respect to the video, in response to determining that the profile of the second user indicates the conflict, and dynamically adjusting a volume of the video so that the second user is outside of an adjusted aural range of the video. The systems and methods may determine that the second user has entered the visual range of the display device, and, in response to determining that the second user has entered the visual range of the video, may alter a visual component of the video.

20 Claims, 9 Drawing Sheets

(56) References Cited

U.S. PATENT DOCUMENTS

| | | |
|---|---|---|
| 9,014,546 B2 | 4/2015 | Shimy et al. |
| 9,288,387 B1 | 3/2016 | Keller |
| 9,668,023 B1 | 5/2017 | Twyman et al. |
| 11,785,294 B2 | 10/2023 | Armaly |
| 2002/0116629 A1 | 8/2002 | Bantz et al. |
| 2002/0174430 A1 | 11/2002 | Ellis et al. |
| 2005/0086069 A1 | 4/2005 | Watson et al. |
| 2005/0251827 A1 | 11/2005 | Ellis et al. |
| 2006/0130121 A1 | 6/2006 | Candelore et al. |
| 2007/0061851 A1 | 3/2007 | Deshpande et al. |
| 2008/0016544 A1 | 1/2008 | Lee et al. |
| 2008/0232602 A1 | 9/2008 | Shearer |
| 2009/0133051 A1 | 5/2009 | Hildreth |
| 2010/0153885 A1 | 6/2010 | Yates |
| 2010/0188279 A1 | 7/2010 | Shamilian et al. |
| 2010/0246835 A1 | 9/2010 | Dooling et al. |
| 2011/0237324 A1 | 9/2011 | Clavin et al. |
| 2012/0060176 A1 | 3/2012 | Chai et al. |
| 2013/0257626 A1* | 10/2013 | Masli ............... G08B 13/19613 340/691.6 |
| 2013/0268954 A1 | 10/2013 | Hulten et al. |
| 2013/0294755 A1 | 11/2013 | Arme et al. |
| 2013/0311575 A1 | 11/2013 | Woods et al. |
| 2013/0332451 A1* | 12/2013 | Camplejohn ......... G06F 16/955 707/722 |
| 2014/0078039 A1 | 3/2014 | Woods et al. |
| 2014/0201767 A1 | 7/2014 | Seiden et al. |
| 2014/0223463 A1 | 8/2014 | Hatambeiki et al. |
| 2014/0250447 A1 | 9/2014 | Schink |
| 2015/0089668 A1 | 3/2015 | Baldwin et al. |
| 2015/0237412 A1 | 8/2015 | Shimy et al. |
| 2015/0245081 A1 | 8/2015 | Cook |
| 2015/0365422 A1 | 12/2015 | Peterson et al. |
| 2016/0066036 A1 | 3/2016 | Felt et al. |
| 2016/0080510 A1 | 3/2016 | Dawoud et al. |
| 2016/0127874 A1 | 5/2016 | Kingsmill et al. |
| 2016/0149547 A1 | 5/2016 | Rider et al. |
| 2021/0281913 A1 | 9/2021 | Armaly |

\* cited by examiner

SYSTEMS AND METHODS FOR DYNAMICALLY ADJUSTING MEDIA OUTPUT BASED ON PRESENCE DETECTION OF INDIVIDUALS

CROSS-REFERENCE TO RELATED APPLICATIONS

This application is a continuation application of U.S. patent application Ser. No. 17/326,842, filed May 21, 2023, which is a continuation application of U.S. patent application Ser. No. 16/471,091, filed Jun. 19, 2019, now U.S. Pat. No. 11,044,525, which is a national stage application under 35 U.S.C. § 371 of International Application PCT/US2016/068655, filed Dec. 27, 2016. The disclosures of which are hereby incorporated by reference herein in their entireties.

BACKGROUND

In related art systems, detection of whether a user has a conflict with a program and thus should not consume that program is performed on a one-dimensional basis. For example, in some related art systems, it is determined whether a user who has a conflict with a program can see the program, and if the user can see the program, the program is obscured. As another example, in other related art systems, it is determined whether a user who has a conflict with a program can hear the program, and if the user can hear the program, the volume of the program is reduced. The related art does not consider that a user may be exposed to media in different ways which can change over time and thus does not monitor for such exposure in all of those different ways.

SUMMARY

Systems and methods are provided herein for transitioning from aural conflict avoidance to visual conflict avoidance when a presence of a conflicted individual is detected. For example, as a child is approaching a parent's bedroom, where the parent is watching a video that includes content not suitable for children, systems and methods are implemented to adjust the volume of the video downward to continually ensure the child cannot hear the video. When the child enters the parent's bedroom, systems and methods are implemented to optionally halt the volume adjustment (and/or to reduce the volume to substantially zero), and to begin taking steps to ensure that the child cannot see the video (e.g., by causing the video to stop playing).

To this end, in some aspects of the disclosure, a media guidance application may cause an output of a video to a display device of a first user. The display device may be, or may be part of, user equipment that is executing the media guidance application. The first user may, for example, be an adult who is consuming a media asset that is rated appropriate for consumption by adults, but is rated as inappropriate for consumption by children.

In some embodiments, the media guidance application may monitor, during the outputting of the video to the first user, for a presence of a second user associated with a profile that indicates a conflict with an audio component of the video. For example, the media guidance application may monitor for a child being able to see or hear the media asset that is rated as inappropriate for consumption by children.

In some embodiments, the media guidance application may detect, during the monitoring, the presence of the second user inside the aural range of the video but outside a visual range of the display device. For example, the media guidance application may detect that the child can hear, but not see, the media asset that is inappropriate for children. To this end, the media guidance application may detect that the second user has entered the aural range of the video based on feedback from a sensor (e.g., based on a camera detecting the presence of the child, where the camera is equipped with a microphone that detects audio from the media asset).

In some embodiments, the media guidance application forms a system with one or more sensors or sensor devices present in the environment surrounding the video. The media guidance application may be connected to the sensors via a wired connection, such as Ethernet or another suitable wired connection, or a wireless connection, such as Wi-Fi, Bluetooth®, or another suitable wireless connection. The sensors may include a security camera, a home assistant device (e.g., Amazon Echo®, Google Home-R, or another suitable device), a personal device (e.g., a smartphone, a wearable device, or another suitable device), or another suitable sensor. The media guidance application may interact with the connected sensors to map the environment surrounding the video. Alternatively or additionally, the media guidance application may interact with the sensors to dynamically assess changes to the environment surrounding the video.

In some embodiments, the media guidance application receives input from a sensor identifying the sensor's location in the home. For example, the media guidance application may receive geolocation information from each sensor. Alternatively or additionally, the media guidance application may receive from the sensor configuration information needed in order to set up a communication link between the media guidance application and the sensor. The configuration information may identify an application program interface that the media guidance application may use to establish the communication link with the sensor. After the communication link is established, the media guidance application may receive real-time information from the sensor via the communication link. Real-time information is information that is delivered immediately after being collected at the sensor. Such information may be received at the media guidance application with minimal to zero delay from the time it was collected at the sensor. The media guidance application may assess dynamic changes to the environment using this real-time information.

The media guidance application may determine an identity of the second user. In some embodiments, the media guidance application may determine the identity of the second user by querying a device of the second user. In some embodiments, the media guidance application may determine the identity of the second user based on a detection of a characteristic of the second user. For example, the media guidance application may query a smartphone or other wearable device that the second user is carrying for the second user's identity, or may use image or voice recognition to identify the second user's identity. The media guidance application may then access the profile of the second user by querying a database of profiles for an entry that matches the identity of the second user, by comparing characteristics of the profile to characteristics of the audio component of the video. The media guidance application may then determine, based on the comparing of the characteristics of the profile to the characteristics of the audio component of the video, that the second user should not be exposed to the audio component of the video.

In some embodiments, the media guidance application may detect, during the monitoring, the presence of the second user within the aural range of the video but outside the visual range of the display device, irrespective of the profile of the second user (e.g., the child). For example, the media guidance application may determine the volume of the video, and may determine a location of a physical obstruction to a transmission of the audio component of the video (e.g., a wall). The media guidance application may then estimate a distance that the audio component of the video will travel based on the determined volume and based on the location of the physical obstruction, and may assign the estimated distance to be the aural range. In other words, the media guidance application may calculate how far the sound is likely to travel based on obstructions surrounding the user equipment that is playing back the audio component of the media asset.

In some embodiments, in response to determining the identity of the second user, the media guidance application may transmit an alert to a device of the first user that specifies the presence of the second user. The alert may name the identity of the second user. For example, the alert may say "ALERT—YOUR CHILD IS APPROACHING YOUR ROOM AND YOU ARE PLAYING A MEDIA ASSET THAT IS INAPPROPRIATE FOR CHILDREN." The media guidance application may receive, in connection with the alert, a command from the first user to discontinue playback of the video. For example, the alert may include a selectable option that, when selected, causes playback of the video to pause or terminate entirely. In response to receiving the command from the first user, the media guidance application may discontinue causing the outputting of the video.

In some embodiments, in response to detecting the presence of the second user within the aural range of the video but outside the visual range of the video, the media guidance application may retrieve a present volume setting of the audio component of the video, and may continually adjust the aural range of the video based on movement of the second user to cause the presence of the second user to be outside an adjusted aural range of the video. The continual adjustment may occur by transmitting commands to adjust a volume of the audio component of the video away from the present volume setting based on movement of the second user. For example, as the child approaches the location that the adult is viewing the media asset that is inappropriate for consumption by children, the media guidance application may continually lower the volume of the media asset to ensure the volume is as loud as it can be without the child hearing it.

In connection with performing the continual adjusting, the media guidance application, in response to detecting any portion of the movement, may detect whether the portion of the movement brings the second user closer to, or farther from, an audio source of the video. In response to determining that the portion of the movement brings the second user closer to the audio source of the video, the media guidance application may reduce the volume of the video in proportion with a magnitude of the portion of the movement. For example, the volume may be reduced one unit for every step taken toward the user equipment playing the video. Similarly, in response to determining that the portion of the movement brings the second user farther from the audio source of the video, the media guidance application may increase the volume of the video in proportion with the magnitude of the portion of the movement. The increasing may be capped at a specified maximum volume (e.g., at a preferred volume setting set by the adult).

In some embodiments, the media guidance application may detect that the second user has moved inside the visual range of the video. For example, the media guidance application may detect, based on input from a camera, that the second user has moved from being behind a wall, to being in an unobstructed doorway, relative to the user equipment, and thus that the second user can now see the video. In some embodiments, the media guidance application receives the image from the camera that is connected to a system including the media guidance application and other connected sensors or sensor devices. By being part of this system, the media guidance application is able to receive real-time information and dynamically assess changes to the environment surrounding the video.

In some embodiments, the media guidance application may detect that the second user has moved inside the visual range of the video by determining a direction in which a display portion of display device is facing (e.g., by determining which direction the display side of a television is facing). The media guidance application may determine a plurality of obstacles that would obstruct a line-of-sight between the second user and the display portion of the display device (e.g., walls, furniture, etc.). The media guidance application may detect that the user has moved inside the visual range of the video when the user is facing a direction opposite the direction in which the display portion of the display device is facing, and when no obstacle of the plurality of obstacles stands between the second user and the display device.

In some embodiments, in response to detecting that the second user has moved inside the visual range of the video, the media guidance application may discontinue the continual adjusting of the aural range of the video. Optionally, further in response to detecting that the second user has moved inside the visual range of the video, the media guidance application may also transmit a command to reduce a volume of the audio component of the video to a volume below a low volume threshold (e.g., by muting the volume).

In response to detecting that the second user has moved inside the visual range of the video, the media guidance application may determine whether the profile of the second user indicates a conflict with a presently displayed portion of the visual component of the video. For example, if the video were to be paused, the media guidance application may determine whether the frame at which the video would be paused itself contains content that is inappropriate for children before pausing at that frame. To this end, the media guidance application may determine a plurality of characteristics of the presently displayed portion of the visual component of the video, and may determine a plurality of characteristics of the profile that the profile indicates would form a conflict for the second user.

The media guidance application may then compare each characteristic of the plurality of characteristics of the presently displayed portion of the visual component of the video to the plurality of characteristics of the profile that the profile indicates would form a conflict for the second user. On the basis of the comparison, the media guidance application may determine whether a characteristic of the plurality of characteristics of the presently displayed portion of the visual component of the video matches a characteristic of the plurality of characteristics of the profile that the profile indicates would form a conflict for the second user.

In response to determining that the profile of the second user indicates the conflict with the presently displayed portion of the visual component of the video, the media guidance application may modify the visual component of the video to resolve the conflict. For example, the media guidance application may black out the pause frame, or may output a display of a different video or image that is suitable for children. In response to determining that the profile of the second user does not indicate a conflict with the presently displayed portion of the visual component of the video, the media guidance application may simply pause the video to cause the displayed portion of the visual component of the video to continue to be displayed.

In some embodiments, when the media guidance application is modifying the visual component of the video to resolve the conflict, the media guidance application may query a database for an image that does not have a characteristic of an image that matches a characteristic of the plurality of characteristics of the profile that the profile indicates would form a conflict for the second user. The media guidance application may retrieve the image from the database, and may generate for display the image in place of the displayed portion of the visual component.

In some embodiments, further in response to detecting the presence of the second user within the aural range of the video but outside the visual range of the video, the media guidance application may generate for display to the second user a warning that the second user should not approach the display device. For example, the second user may be a person of a political persuasion different from the first user, and may be easily upset by media of the opposite political persuasion of his own. Thus, the media guidance application may warn the second user not to approach the user equipment if it is playing back media related to the opposite political persuasion of the second user.

In some embodiments, the media guidance application may determine that, notwithstanding the warning, the user has advanced toward the display device. In response to determining that the user has advanced toward the display device, the media guidance application may generate for display an alert to the second user including additional information about what is being displayed on the display device beyond what was included in the warning, where the additional information specifies the conflict. For example, the warning may state that the media being played back is of the political persuasion opposite of the second user's political persuasion.

In some aspects of the disclosure, a system is provided for transitioning from aural conflict avoidance to visual conflict avoidance when a presence of a conflicted individual is detected. The system may include one or more sensors. For example, the system may include an external sensor such as a security camera. The sensor may be configured to transmit configuration information for establishing a communication link with the sensor, first real-time information indicating a presence of a second user, and second real-time information indicating that the second user has moved.

The system includes a media guidance application that may be configured to receive the configuration information from the sensor. The media guidance application may determine, based on the configuration information, an application program interface to communicate with the sensor. The media guidance application may establish, using the application program interface, the communication link with the sensor. The media guidance application may cause an output of a video to a display device of a first user. The media guidance application may receive, from the sensor, during the outputting of the video to the first user, the first real-time information indicating the presence of the second user. The media guidance application may determine that the second user is associated with a profile that indicates a conflict with an audio component of the video.

The media guidance application may detect, based on the first real-time information, that the second user is inside an aural range of the video but outside a visual range of the display device. The media guidance application may, in response to detecting the presence of the second user within the aural range of the video but outside the visual range of the video, retrieve a present volume setting of the audio component of the video. The media guidance application may continually adjust the aural range of the video by transmitting commands to adjust a volume of the audio component of the video away from the present volume setting based on movement of the second user to cause the presence of the second user to continually be outside an adjusted aural range of the video. The media guidance application may receive, from the sensor, the second real-time information indicating that the second user has moved.

The media guidance application may detect, based on the second real-time information, that the second user has moved inside the visual range of the video. The media guidance application may, in response to determining that the second user has moved inside the visual range of the video, determine whether the profile of the second user indicates a conflict with a presently displayed portion of the visual component of the video. The media guidance application may, in response to determining that the profile of the second user indicates the conflict with the presently displayed portion of the visual component of the video, modify the visual component of the video to resolve the conflict.

DETAILED DESCRIPTION

Figure 1:
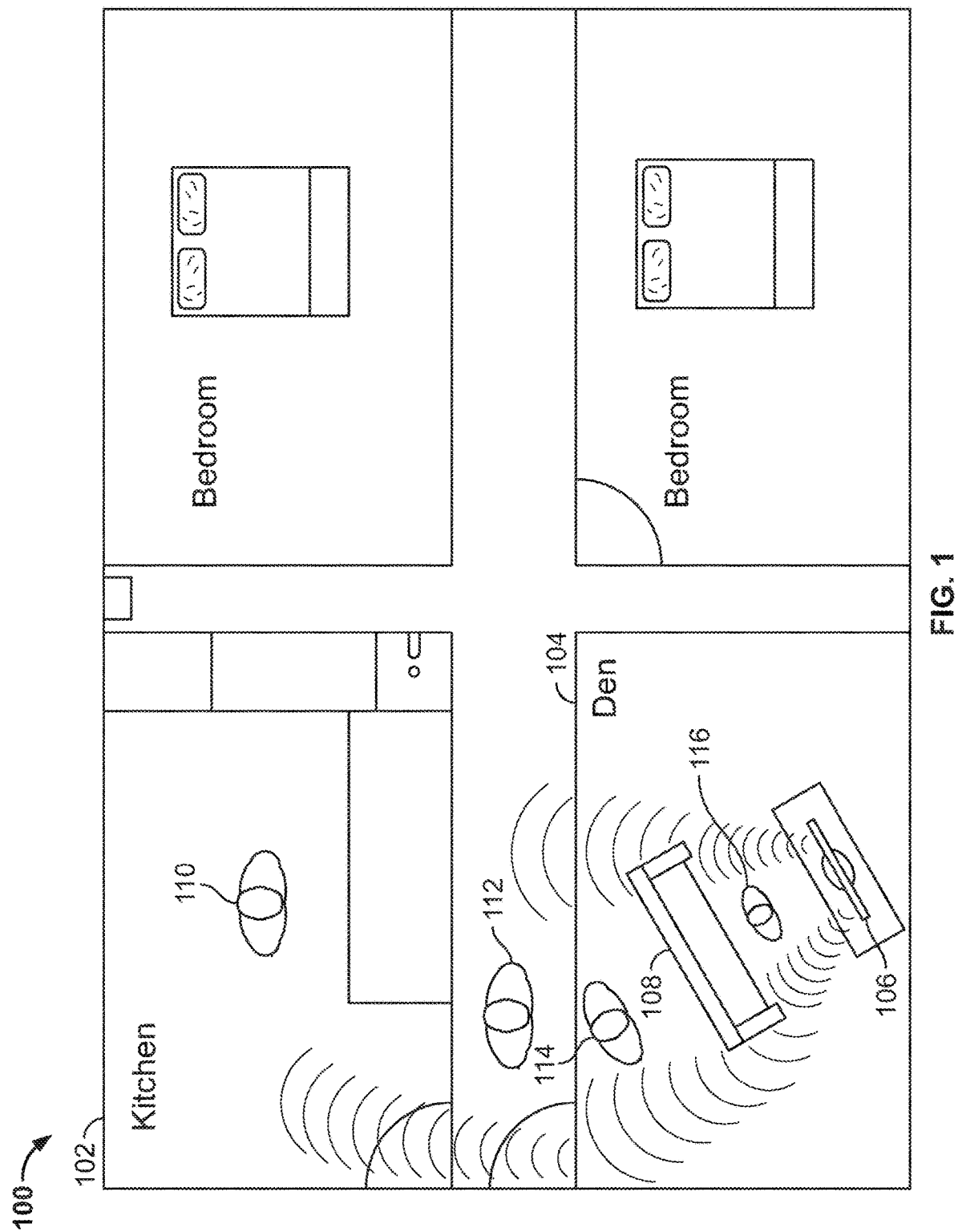
FIG. 1 depicts an illustrative embodiment of a layout of a home, where an ability of a person to hear or see media being displayed by user equipment is monitored, in accordance with some embodiments of the disclosure.

FIG. 1 depicts an illustrative embodiment of a layout of a home, where an ability of a person to hear or see media being displayed by user equipment is monitored, in accordance with some embodiments of the disclosure. As illustrated, FIG. 1 includes kitchen 102, den 104, user equipment 106, and obstacle 108. Obstacle 108, while illustrated as a couch, may be any obstacle that obstructs a line of sight when obstacle 108 stands between a person's eyes and a display component of user equipment. Kitchen 102 and den 104, as used herein, may be replaced by any other bounded area inside or outside of a household, and are named "kitchen" and "den" for illustrative purposes only.

FIG. 1 also illustrates several positions at which a user may be detected (e.g., position 110, position 112, position 114, and position 116). The detection may be achieved by way of a media guidance application interacting with one or more sensors. These positions are not an exhaustive list of positions at which the media guidance application may detect a user. Specifics of the media guidance application, as well as manners in which the media guidance application may detect a user, are described in further detail below.

In some aspects, a media guidance application may cause an output of a video to a display device of a first user. For example, as depicted, obstacle 108 is a couch. A first user named Amanda may be sitting on the couch, and may be consuming video by way of user equipment 106, which has a display component that is facing the couch. The media guidance application, instead of causing the output of the video to a display component of user equipment 106, may simply detect that the video is being displayed by the display component of user equipment 106. The media guidance application may be executed, in whole or in part, by control circuitry of user equipment 106, by other user equipment within household 100, and/or by a server remote to household 100. Functionality of the media guidance application, control circuitry, remote devices, and communications networks are described in further detail below with respect to FIGS. 4-7.

In some embodiments, the media guidance application may monitor, during the outputting of the video to the first user by user equipment 106, for a presence of a second user associated with a profile that indicates a conflict with an audio component of the video. As used herein, the term "conflict with an audio component" is defined to mean an existence of a setting associated with a profile of a user (in this case, the second user) that indicates a preference for the user to not hear the audio component of the video. The setting may be generated based on input by the user or input by another user. For example, the second user may expressly indicate to the media guidance application that he does not like to listen to political conversation, or to political conversation from one political party. Thus, a conflict would arise if the media guidance application determines that the second user is present (i.e., within aural range of the audio component of the video), and that the audio component of the video includes political conversation from the disliked political party.

As another example, the first user may be a parent, and the second user may be a child. The media guidance application may detect input from the parent that indicates a preference for his child to not hear audio reflective of sexual content or violence. Thus, a conflict would arise if the media guidance application determines that the second user is present when the audio component of the video includes content of a sexual or violent nature.

The setting could be brought into existence without an express user command to bring the setting into existence. For example, the media guidance application may monitor historical interactions between a given user and various media. The media guidance application may determine, based on any algorithm that correlates historical interactions with user preferences, that a user has a preference to not be exposed to certain media. For example, if the media guidance application determines that the user is of the Democratic political party, which opposes the Republican political party in the United States of America, based on the user's interactions with political affiliates, the media guidance application may determine a preference of the user to avoid being exposed to media relating to Republican politics. As another example, if the media guidance application determines that the user typically performs activities that a young child would perform, the media guidance application may determine that content of a violent or sexual nature would be inappropriate to expose the child to. The media guidance application may generate settings related to conflict avoidance on the basis of such historical interactions.

When performing the monitoring for the presence of the second user, the media guidance application may additionally monitor content of the audio component of the video to determine whether the audio component, at any given moment, includes content that may conflict with a setting of the profile of the second user. The media guidance application may continually determine, using natural language processing, closed captioning, subtitle information, program or scene metadata, or the like, whether the audio component of the video is related to one or more topics. As one example, the media guidance application may determine whether the audio component of the video, over the course of a predetermined period of time, includes a threshold number of keywords that satisfy certain criteria (e.g., vulgarity, words of a sexual nature, words related to violence, etc.). If a threshold number of keywords is achieved within a given period of time (say, 60 seconds), then the media guidance application may determine that the audio component of the video relates to a given theme associated with that certain criteria (e.g., the audio component relates to violence at this time). The media guidance application may determine that, at a later period of time, the number of keywords achieved has dropped below the threshold, and the media guidance application may responsively determine that the audio component no longer satisfies that criteria (e.g., the video has move on to a non-violent scene).

In some embodiments, the media guidance application may determine whether, at any given point of playback of the video, the audio component includes content that may conflict with settings of a profile of the second user based on metadata associated with that given point of playback of the video. The media guidance application may determine whether metadata associated with a given point of playback of the video indicates that the content of the audio component at that given point corresponds to a potentially conflicted topic, category, or type of audio. The metadata may be input by an editor to indicate one or more topics, categories, or types corresponding to the audio at each given point, and may be transmitted with the content itself (e.g. as part of the digital transmission), or stored at a database and retrieved by the media guidance application.

Alternatively, or additionally, the metadata may be input by users of a social networking service, where the users may annotate any given frame, scene, or other portion of a video with observed information. If the media guidance application detects, for example, that a threshold number of users have made such an annotation, or have otherwise communicated at a time corresponding with a given point of the video using keywords that correspond to a certain topic, type, or category of media, the media guidance application may determine that the given point of the audio component of the video corresponds to a certain topic, type, or category. The media guidance application may then compare the topic, type, or category to the settings of the profile of the second user to determine whether a conflict has formed. Manners in which a media guidance application may process user annotations and/or comments are discussed in commonly owned U.S. patent application Ser. No. 15/165,061, filed May 26, 2016, currently pending, commonly owned U.S. patent application Ser. No. 13/472,848, published as U.S. Patent Application Publication No. 2013/0311575, filed May 16, 2012, now abandoned, and commonly owned U.S. patent application Ser. No. 13/463,300, published as U.S. Patent Application Publication No. 2013/0294755, filed May 3, 2012, now abandoned, the disclosures of which are each hereby incorporated by reference herein in their entireties.

In some embodiments, the media guidance application may detect, during the monitoring, the presence of the second user inside the aural range of the video but outside a visual range of the display device. The media guidance application may determine, for example, that the second user is initially at position 110, where no audio of the video playing on user equipment 106 can be heard (e.g., due to the walls of the den and kitchen acting as obstacles to the transmission of sound). As the media guidance application continues to monitor the presence of the second user, the media guidance application may determine that the second user has moved to position 112, where the media guidance application may determine that the second user can hear the audio component, but not see the visual component, of the video playing from user equipment 106.

The media guidance application may determine whether, at a given position (e.g., position 110, position 112, position 114, and position 116), the second user is able to hear an audio component, or see a visual component, of a video being played by user equipment 106, in various manners. In some embodiments, the media guidance application may entirely rely on sensors to perform these detections, without knowledge of who the second user is or where the given position is. For example, the media guidance application may query a microphone at a given position (e.g., a microphone of user equipment being carried by the second user, such as a microphone of a mobile telephone) to detect whether the microphone detects the audio component (or whether the microphone detects the audio component at a level audible to an average human being). As another example, the media guidance application may query a camera at the position of the display component of user equipment 106 to determine whether the second user is visible to the camera, and thus within visual range of the display component of user equipment 106. In either of these cases, the media guidance application is able to determine whether, at a given position, the second user is able to hear or see the video, without knowing any information about the user or about household 100 beyond knowing the user's position.

In some embodiments, the media guidance application forms a system with one or more sensors or sensor devices present in the environment surrounding the video. The media guidance application may be connected to the sensors via a wired connection, such as Ethernet or another suitable wired connection, or a wireless connection, such as Wi-Fi, Bluetooth®, or another suitable wireless connection. The sensors may include a security camera, a home assistant device (e.g., Amazon Echo®, Google Home®, or another suitable device), a personal device (e.g., a smartphone, a wearable device, or another suitable device), or another suitable sensor. The media guidance application may interact with the connected sensors to map the environment surrounding the video. Alternatively or additionally, the media guidance application may interact with the sensors to dynamically assess changes to the environment surrounding the video.

In some embodiments, the media guidance application receives input from a sensor identifying the sensor's location in the home. For example, the media guidance application may receive geolocation information from each sensor. Alternatively or additionally, the media guidance application may receive from the sensor configuration information needed in order to set up a communication link between the media guidance application and the sensor. The configuration information may identify an application program interface that the media guidance application may use to establish the communication link with the sensor. After the communication link is established, the media guidance application may receive real-time information from the sensor via the communication link. Real-time information is information that is delivered immediately after being collected at the sensor. Such information may be received at the media guidance application with minimal to zero delay from the time it was collected at the sensor. The media guidance application may assess dynamic changes to the environment using this real-time information.

In some embodiments, the media guidance application may require information about either a relative location (e.g., with respect to obstacles, such as obstacle 108, a wall of a room, and the like), or an absolute location (e.g., on a coordinate basis using an indoor positioning system) of the given position in order to determine whether, at that position, the second user can hear or see the video displayed by user equipment 106. The media guidance application may determine an absolute location of the second user within household 100 using an indoor positioning system. An indoor positioning system uses a mapping (e.g., floor plan) of a household (e.g., household 100), in conjunction with other data, in order to determine where a person is within the mapping. In some embodiments, the other data may be global positioning system (GPS) coordinates. In other embodiments, the other data may be a use of signal strength measurements with respect to multiple devices (e.g., if the second user is carrying around a wireless device, the wireless device's signal strength may be compared with respect to multiple other devices with known locations in household 100, and this totality of information may be used to triangulate where the user is located).

Additionally, or alternatively, other sensors may be used to determine the location of the second user within the floor plan. As one example, a camera may be used to capture an image of the second user, as well as surroundings of the second user. In some embodiments, the media guidance application receives the image from the camera that is connected to a system including the media guidance application and other connected sensors or sensor devices. By being part of this system, the media guidance application is able to receive real-time information and dynamically assess changes to the environment surrounding the video.

The media guidance application may compare characteristics of the surroundings to known characteristics of household 100 in order to determine whether there is a match. If there is a known match, the media guidance application may use the image to compute where in the mapping of household 100 the second user is located. As another example, a microphone may be used to capture sounds unique to a certain location (e.g., the sound of sizzling, which is indicative of the sound coming from the kitchen). The media guidance application may determine the source of the sound based on a database that stores unique characteristics of various sounds that correspond uniquely to certain rooms of a household. The media guidance application may then determine a distance from the source based on, e.g., a volume of the sound. This information may be combined with other information (e.g., camera information, GPS information, and the like) by the media guidance application in order for the media guidance application to more accurately determine a location of the user.

After determining the location of the second user, the media guidance application may determine, based on that location, whether the second user can see or hear the video being displayed by the display component of user equipment 106. For example, if the media guidance application determines that the second user is at position 110, the media guidance application may determine that the second user can neither see nor hear the video. This determination may occur because the media guidance application affirmatively determines that a microphone at position 110 (e.g., the microphone of a mobile telephone the second user his holding) cannot detect the audio component, and because the indoor positioning system indicates to the media guidance application that a kitchen wall forms an obstacle to the user's view of user equipment 106.

Alternatively, the media guidance application may determine that the user cannot hear the video at position 110 based on sensors that are not at position 110. For example, the media guidance application may instead determine the volume of the audio component, and may calculate an estimated loss in volume as the audio component travels through the various obstacles in the path between position 110 and user equipment 106 (as determined by way of an indoor positioning system). The media guidance application may calculate that the walls of the den and the kitchen, as well as natural attenuation of volume as sound travels, would cause the audio component to be inaudible at position 110.

The media guidance application, using the same techniques described with respect to position 110, may determine that the second user at position 112 is able to hear the audio component of the video being played on user equipment 106, but is not able to see the visual component (e.g., because the wall of the den is acting as an obstacle to the second user's ability to see the display component of user equipment 106). Thus, if the media guidance application determines that the user is at position 112, the media guidance application may detect, during the monitoring, the presence of the second user within the aural range of the video but outside the visual range of the display device.

Before or after the media guidance application determines that the second user has come to position 112 (and thus has become within aural range of the video but outside the visual range of the display device), the media guidance application may determine an identity of the second user. The reason the media guidance application would determine the identity of the second user is to determine whether the second user is associated with profile information that indicates a conflict with the audio component of the video.

In some embodiments, the media guidance application may learn the identity of the second user by querying a device of the second user for information indicative of the profile of the second user. For example, the media guidance application may query a database to learn devices known to it, such as all devices of the residents of household 100. The media guidance application may then broadcast a HELLO request throughout household 100 (e.g., through a wireless router within household 100) that signals the media guidance application would like to hear a response from all devices that receive the HELLO request. The media guidance application may, based on latency or signal strength corresponding to the replies received to the HELLO request, determine roughly where, in the context of a mapping known by way of an indoor positioning system, each device that responded to the HELLO request is presently located. The media guidance application may determine that one of the devices is at position 112, and may determine that that device is associated with a user profile which indicates the identity of its owner. Thus, the media guidance application may retrieve, from that profile, the identity of the second user.

In some embodiments, the media guidance application may determine the identity of the second user based on characteristics of the second user. For example, the media guidance application may retrieve data from various sensors, such as a camera, a microphone, a scale (e.g., if household 100 has weight sensors under the floor of household 100), and the like. The media guidance application may compare characteristics of the second user (e.g., facial characteristics, height, weight, voice characteristics, and the like) to characteristics of users known to the media guidance application (e.g., characteristics of the residence of household 100, or characteristics known to a broader population), where the characteristics of these users are stored in a database accessible to the media guidance application. The media guidance application may determine the identity of the second user by determining whether a threshold amount of these characteristics match characteristics of a known user.

Regardless of how the identity of the second user is determined, the media guidance application may determine, based on the identity of the second user, whether characteristics of the audio component of the video form a conflict with characteristics associated with the second user. Determination of whether a conflict exists is described above in greater detail. Mechanisms for determining whether a conflict exists between a person and media being displayed on user equipment is also described in commonly owned U.S. Pat. No. 9,014,546, issued on Apr. 21, 2015, the disclosure of which is hereby incorporated by reference herein in its entirety. Upon determination that a conflict does in fact exist, the media guidance application will determine that the second user should not be exposed to the audio component of the video.

In some embodiments, the media guidance application may determine traits of the second user based on the profile of the second user. The media guidance application may use these traits to determine the aural range of the video, or to modify an aural range that was determined without knowledge of the identity of the second user. As an example, if the second user is deaf, the media guidance application may determine that the aural range is zero, or is negligible, and may determine that the second user would never be within aural range of the video because the second user cannot hear. If the second user is hard of hearing, but not deaf, the media guidance application may determine the aural range of the video with respect to the second user to be smaller than it would be with respect to someone who is not hard of hearing. The media guidance application may compute or modify an aural range based on a predefined function that factors in parameters available from the user profile (e.g., parameters indicative of how hard of hearing a person is on a quantitative basis).

Figure 2:
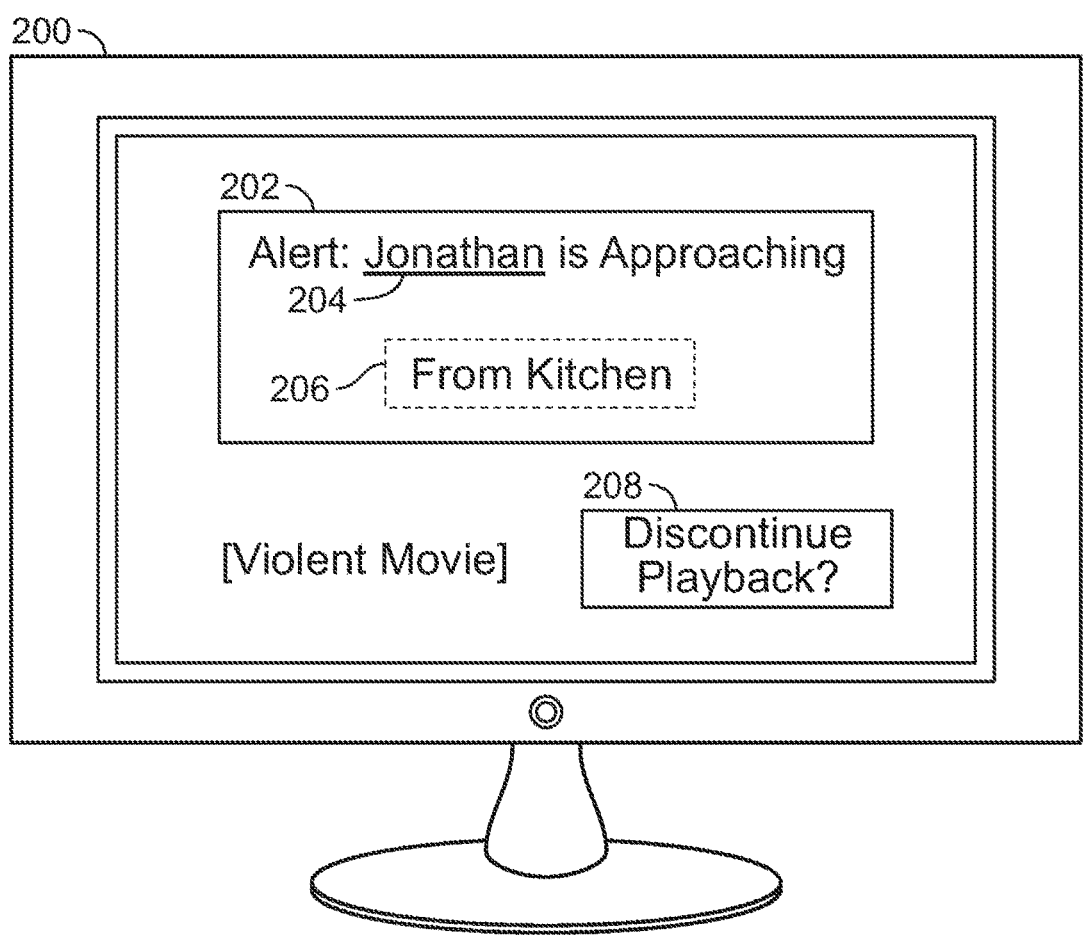
FIG. 2 shows an illustrative embodiment of user equipment with a display that includes an alert about an approaching person, in accordance with some embodiments of the disclosure.

FIG. 2 shows an illustrative embodiment of user equipment with a display that includes an alert about an approaching person, in accordance with some embodiments of the disclosure. In some embodiments, user equipment 200 is a close-up version of user equipment 106. In some embodiments, user equipment 200 is different from user equipment 106, and may be some other user equipment visible by the first person (e.g., the person viewing user equipment 106 from obstacle 108), such as a smartphone carried by the first person. While a violent movie is depicted in the background of user equipment 200, presentation of the violent movie with alert 202 is optional. Alert 202 may include identity 204, which reflects the identity of the second user. Alert 202 may additionally include location 206, which is the location where the second user was last detected (e.g., kitchen 102).

In some embodiments, in response to determining the identity of the second user, the media guidance application may transmit an alert (e.g., alert 202 to a device of the first user (e.g., user equipment 200), or to the device playing the video (e.g., user equipment 106) that specifies the presence of the second user. The alert may name the identity of the second user (i.e., identity 204). For example, the media guidance application may cause the alert to say "ALERT— JONATHAN IS APPROACHING" if the second user is named Jonathan. The media guidance application may also provide a description of where the second user is approaching from (e.g., position 110, which corresponds to kitchen 102 of household 100). The media guidance application may provide other descriptive information, such as information about the age of the second user, and information relating to why the alert is being provided (e.g., a child is approaching and the video being played is not appropriate for children).

The media guidance application may receive, in connection with the alert, a command from the first user to discontinue playback of the video. For example, the alert may include a selectable option (e.g., selectable option 208) that, when selected, causes playback of the video to pause or terminate entirely. In response to receiving the command from the first user, the media guidance application may discontinue causing the outputting of the video. The command may include express instructions to pause, or to terminate entirely, the video. Alternatively, the media guidance application may determine whether to pause, or to terminate entirely, the video. Discussion of the media guidance application determining whether to pause the video, or terminate the video entirely, is described in further detail below.

In some embodiments, in response to detecting the presence of the second user within the aural range of the video but outside the visual range of the video, the media guidance application may continually adjust the aural range of the video based on movement of the second user to cause the presence of the second user to be outside an adjusted aural range of the video. For example, returning to FIG. 1, as the second user moves from position 112 toward position 114, the media guidance application may continually lower the volume of the media asset to ensure the volume is as loud as it can be without the second user hearing the audio component of the video being played by user equipment 106.

The media guidance application, when continually adjusting the volume of the video being played by user equipment 106, may continually calculate what adjustment is to be made to the volume. To this end, the media guidance application may monitor movement of the second user, both in terms of magnitude of the movement and direction of the movement. In response to detecting movement of the second user, the media guidance application may detect whether the portion of the movement brings the second user closer to, or farther from, an audio source of the video (e.g., based on the direction of movement of the second user relative to user equipment 106). The media guidance application may determine direction of movement by determining a location of the second user at two different times (in the same manner described above), and then computing the direction of the movement relative to user equipment 106 by computing a vector pointing from the location of the second user at the earlier time, to the location of the second user at the later time.

In response to determining that the portion of the movement brings the second user closer to the audio source of the video, the media guidance application may reduce the volume of the video in proportion with a magnitude of the portion of the movement. For example, the volume may be reduced one unit for every step taken toward the user equipment playing the video. Similarly, in response to determining that the portion of the movement brings the second user farther from the audio source of the video, the media guidance application may increase the volume of the video in proportion with the magnitude of the portion of the movement. Similar to determining direction of the movement, the media guidance application may determine magnitude of the movement based on a distance of the vector between the position of the second user at the earlier time and at the later time.

Magnitude of movement, as well as direction of movement, may be calculated in other manners than those described above. For example, the media guidance application may have access to sensors that accurately calculate direction and magnitude of movement, such as a compass installed on user equipment that the second user is carrying, GPS coordinates or indoor positioning system coordinates calculated at two different points in time and then compared to one another to compute a magnitude, and the like.

In some embodiments, when the media guidance application increases the volume proportionally to a magnitude of movement of the second user, the media guidance application may stop increasing the volume at a specified maximum volume. In some embodiments, the specified maximum volume may correspond to a volume that the first user was listening to the video at prior to the media guidance application detecting the presence of the second user within the aural range of the audio component of the video. In other embodiments, the maximum volume may be a default setting, or a user-specified setting that was set in advance and stored in a database.

Figure 3:
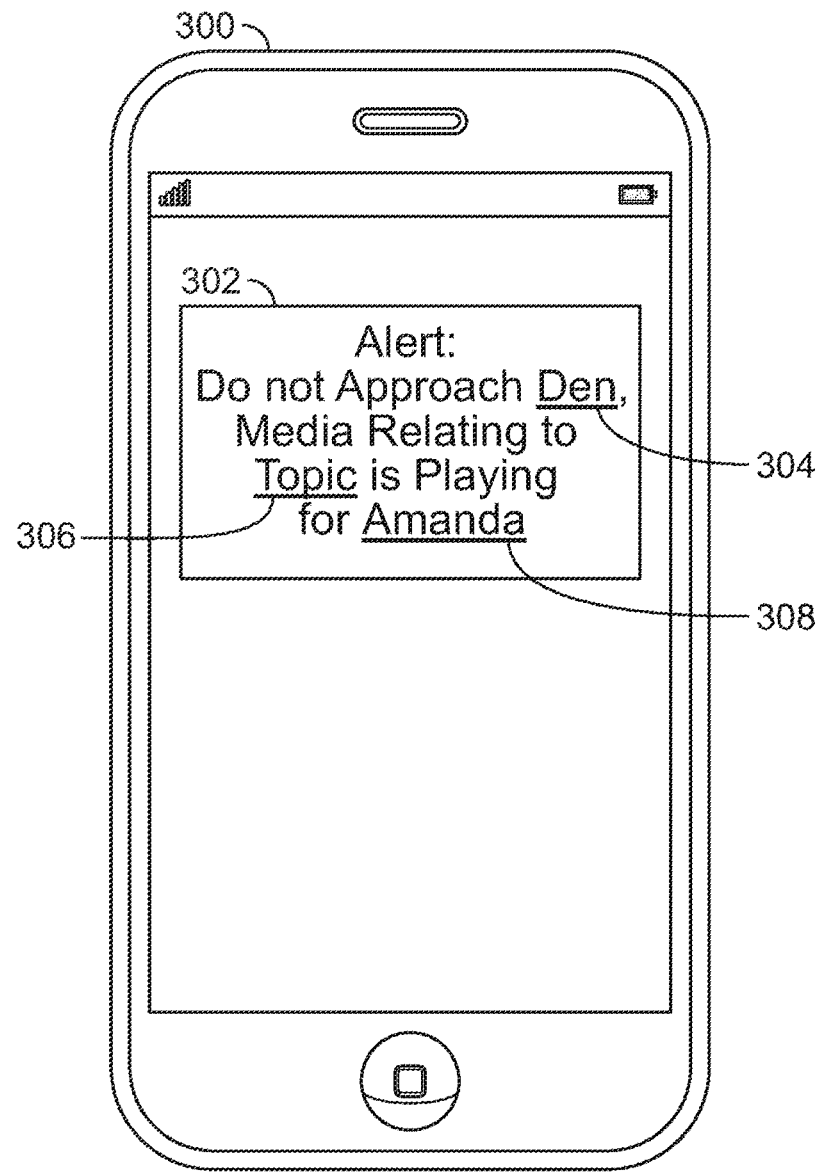
FIG. 3 shows an illustrative embodiment of user equipment with a display that includes an alert about media being provided by user equipment at a location that a user is approaching, in accordance with some embodiments of the disclosure.

FIG. 3 shows an illustrative embodiment of user equipment with a display that includes an alert about media being provided by user equipment at a location that a user is approaching, in accordance with some embodiments of the disclosure. FIG. 3 depicts user equipment 300. User equipment 300 may be the same as user equipment 106 or user equipment 200, or may be different user equipment. User equipment 300 is depicted with a display that indicates alert 302. Alert 302 warns the second user to avoid approaching location 304. In some embodiments, alert 302 additionally warns the second user to avoid location 304 because media relating to topic 306 is playing at location 304. In some embodiments, alert 302 notes that the media relating to topic 306 is playing for first user 308.

In some embodiments, when the media guidance application detects the presence of the second user within the aural range of the video but outside the visual range of the video, the media guidance application may generate for display to the second user (e.g., by user equipment 300) a warning (e.g., alert 302) that the second user should not approach the display device. User equipment 300 may be owned and carried by the second user, or may be otherwise visible to or within aural range of the second user. Alert 302 may, in some embodiments, be transmitted aurally to the second user, rather than visually. Alert 302 may indicate location 304 at which the video is being played in order to specify where the second user should avoid.

In some embodiments, the media guidance application may include topic 306 in alert 304. For example, the media guidance application may determine, based on the profile of the second user, that the second user is a person of a political persuasion different from the first user, and may be easily upset by media of the opposite political persuasion of his own. Thus, the media guidance application may warn the second user not to approach the user equipment if it is playing back media related to the opposite political persuasion of the second user. Any such conflict may cause topic 306 to be indicated to the second user.

In some embodiments, the media guidance application may determine that, notwithstanding alert 302, the second user has advanced toward user equipment 106. In response to determining that the second user has advanced toward user equipment 106, the media guidance application may generate for display an alert (e.g., an augmented alert 302, or a different alert 302) to the second user including additional information about what is being displayed on user equipment 106 beyond what was included in the warning, wherein the additional information specifies the conflict. For example, the warning may state that the media being played back is specifically relating to the political persuasion opposite of the second user's political persuasion, and that this may upset the second user.

In some embodiments, the media guidance application may detect that the second user has moved inside the visual range of the video. For example, the media guidance application may detect, as illustrated in FIG. 1, that the second user has moved from position 112 to position 116. The manner in which the media guidance application may detect the movement of the second user is described above. The media guidance application may determine that, at position 116, the user is inside the visual range of the video using a variety of manners that are described below in great detail.

In some embodiments, the media guidance application may detect that the second user has moved inside the visual range of the video by determining a direction in which a display portion of a display device is facing. For example, the media guidance application may use a camera to determine which direction the display side of a television (or other user equipment 106) is facing. As another example, the media guidance application may use a light sensor to detect on which side of user equipment 106 light is emitted.

Additionally, the media guidance application may determine a plurality of obstacles (e.g., obstacle 108) that would obstruct a line-of-sight between the second user and the display portion of the display device (e.g., walls, furniture, etc.). The media guidance application may detect the obstacles in any manner described above. For example, the media guidance application may detect the obstacles using a sensor, such as a camera. As another example, the media guidance application may determine the obstacles based on a known mapping of household 100.

The media guidance application may detect that the user has moved inside the visual range of the video when the user is facing a direction opposite the direction in which the display portion of user equipment 106 is facing (e.g., the user is facing the screen of a television, and the screen of the television is facing the user). When the media guidance application determines that no obstacle of the plurality of obstacles stands between the second user and the display device, the media guidance application may determine that the user has moved inside the visual range of the video.

In some embodiments, the media guidance application, when determining whether the user (e.g., the second user) has moved inside the visual range of the video, may leverage information from a profile of the user. For example, the media guidance application may determine that the second user is a child of the age of four, or that the second user has a height of three feet, based on information from the profile of the second user. Thus, if the second user is standing at position 114, obstacle 108 (in this case, a couch) may obstruct a line of vision between the second user and user equipment 106 if obstacle 108 is more than three feet tall. The media guidance application may therefore determine, at position 114, based on profile information of a given user, that some users would be in visual range, while other users would not be in visual range, of user equipment 106. As another example, a profile may indicate that a given user is nearsighted, and thus the media guidance application may determine that the video displayed on user equipment 106, while visible to the given user at position 116, may not be intelligible to the given user, and therefore the user is not in visual range of the video.

In some embodiments, in response to detecting that the second user has moved inside the visual range of user equipment 106, the media guidance application may discontinue the continual adjusting of the aural range of the video being played by user equipment 106. For example, as the second user is now exposed to the visual component of the video, further attempts to mitigate exposure to the audio component of the visual component of the video would be moot.

Optionally, the media guidance application may reduce a volume of the audio component of the video to a volume below a low volume threshold when the user is within visual range of the video. The term low volume threshold, as used herein, is a threshold that is inaudible to the second user. For example, the threshold may be substantially zero, and thus the media guidance application may mute the volume to reduce the volume to be below the low volume threshold. The low volume threshold may be programmed by an editor, or may be based on an algorithm that considers user profile information. In the latter example, the low volume threshold may vary depending on the ability of the second user to hear. If the second user is deaf, the media guidance application may set the low volume threshold to be a maximum volume, and may avoid continually dropping the volume of the video. If the second user is hard of hearing, but not deaf, the media guidance application may compute a highest volume that the user cannot hear based on a pre-programmed algorithm, and may set the low volume threshold to be that highest volume.

In some embodiments, the media guidance application may determine whether the profile of the second user indicates a conflict with a presently displayed portion of the visual component of the video. For example, if the video were to be paused, the media guidance application may determine whether the frame at which the video would be paused itself contains content that is inappropriate for children before pausing at that frame. To this end, the media guidance application may determine a plurality of characteristics of the presently displayed portion of the visual component of the video, and may determine a plurality of characteristics of the profile that the profile indicates would form a conflict for the second user.

In some embodiments, the media guidance application, when determining the plurality of characteristics of the presently displayed portion of the video component of the video, may determine the characteristics by performing object recognition and/or facial recognition algorithms on the presently displayed portion of the video component. For example, the media guidance application may discern unique characteristics about each object and face within a given video frame, and may compare those characteristics to entries of a database that correspond unique characteristics to an identity of an entity, and may learn from the comparison the identity of that entity. Alternatively, the media guidance application may determine the content of the displayed portion of the video component based on metadata associated with the displayed portion. The metadata may be obtained in the same manner described above with respect to retrieving metadata relating to the audio component of the video. No matter how the entities within the presently displayed portion of the video are determined, the media guidance application may compare characteristics associated with each entity to characteristics of the profile of the second user to determine if there is a conflict. This comparison and conflict determination may be performed by the media guidance application in the same manner this comparison and determination are performed with respect to identifying conflicts between the second user and the audio component of the video, as described above.

In some embodiments, the media guidance application may determine that the profile of the second user does not indicate a conflict with the presently displayed portion of the visual component of the video. In such a case, the media guidance application may simply cause the video to pause, thus displaying a freeze-frame of the presently displayed portion of the visual component of the video. Substitute visuals, described below, may equally be used when there is no conflict.

In some embodiments, the media guidance application may determine that the profile of the second user does indicate a conflict with the presently displayed portion of the visual component of the video. The media guidance application may responsively modify the visual component of the video to resolve the conflict. For example, the media guidance application may black out some of (e.g., the portion forming a conflict), or all of, the presently displayed portion of the visual component of the video. As another example, the media guidance application may output a display of a different video or image that is suitable for children. As another example, playback of the video may resume on another device, such as user equipment 200, of the first user, where the second user is not able to see a display component of that other device.

In some embodiments, when the media guidance application is modifying the visual component of the video to resolve the conflict, the media guidance application may query a database for an image that does not have a characteristic of an image that matches a characteristic of the plurality of characteristics of the profile that the profile indicates would form a conflict for the second user. The media guidance application may retrieve the image from the database, and may generate for display the image in place of the displayed portion of the visual component. Further manners in which the media guidance application may modify video content (e.g., by obscuring, altering, or moving the video content to another device) to avoid a second user from seeing that video content are described in U.S. patent application Ser. No. 13/948,369, published as U.S. Pat. App. Pub No. 2014/0250447, now abandoned, filed Jan. 23, 2013, as well as U.S. Pat. No. 8,893,169, issued on Nov. 18, 2014, the disclosures of each which are hereby incorporated by reference herein in their entirety.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
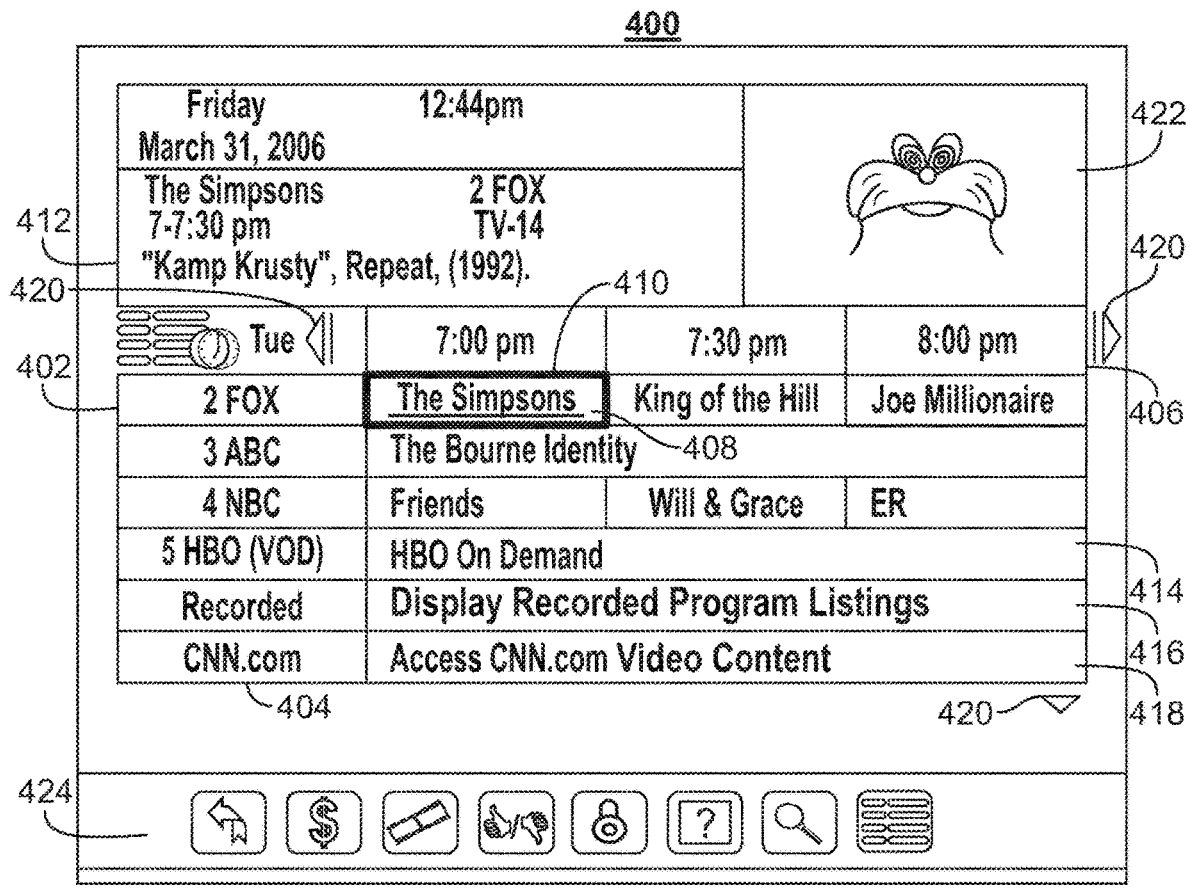
FIG. 4 shows an illustrative embodiment of a display screen that may be used to provide media guidance application listings and other media guidance information, in accordance with some embodiments of the disclosure.
Figure 5:
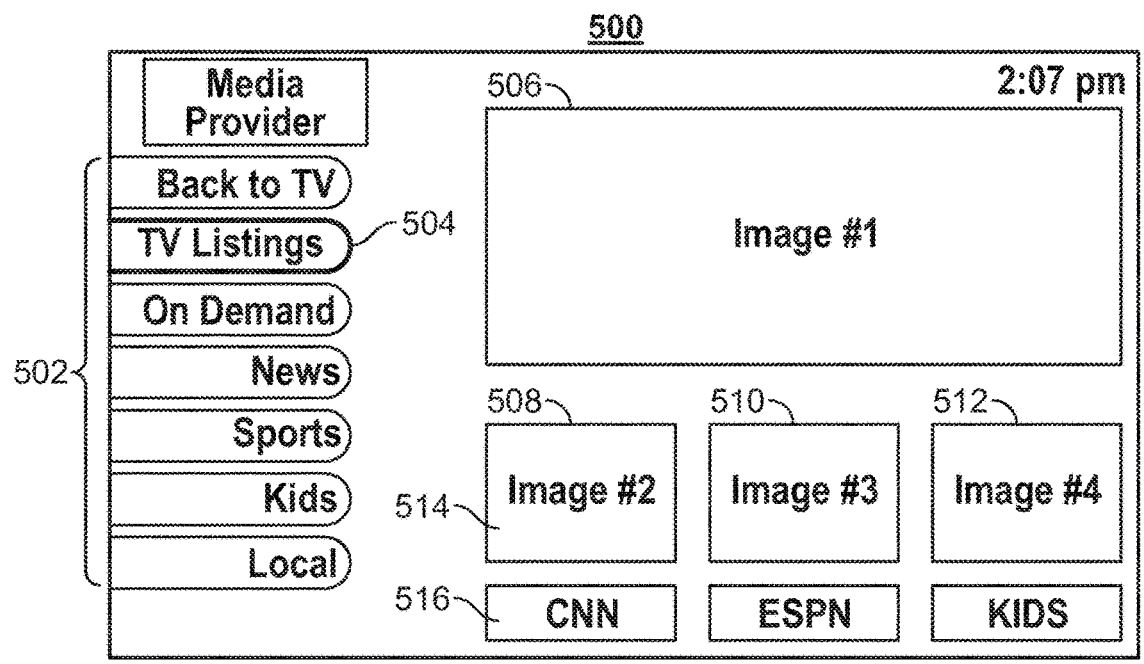
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422 and options region 424. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 424 may allow the user to access different types of content, media guidance application displays, and/or media guidance application features. Options region 424 may be part of display 400 (and other display screens described herein), or may be invoked by a user by selecting an on-screen option or pressing a dedicated or assignable button on a user input device. The selectable options within options region 424 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
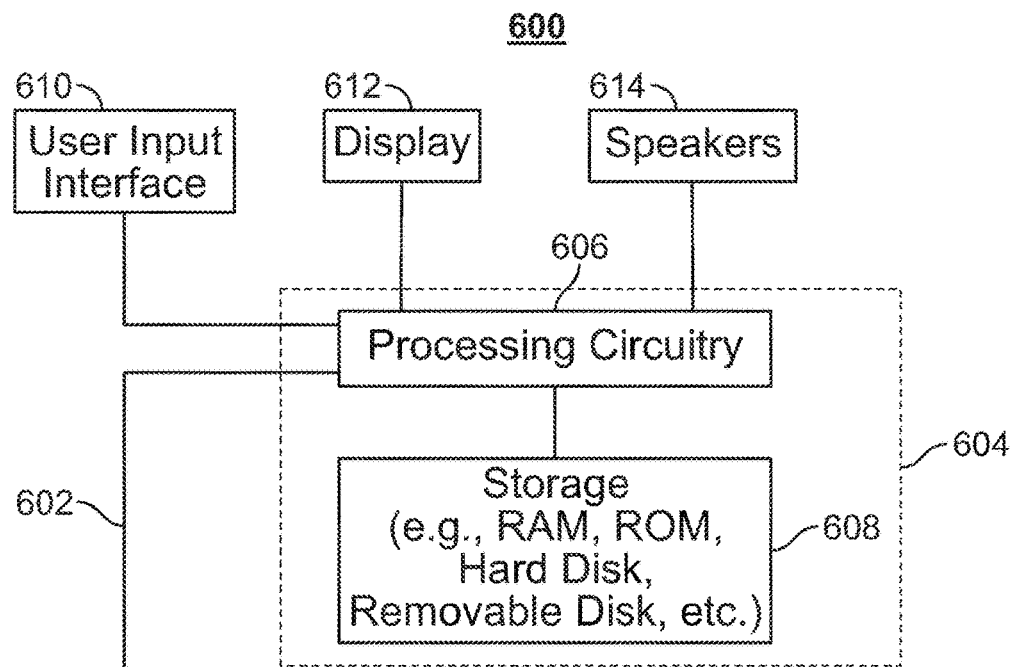
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path

602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders. BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
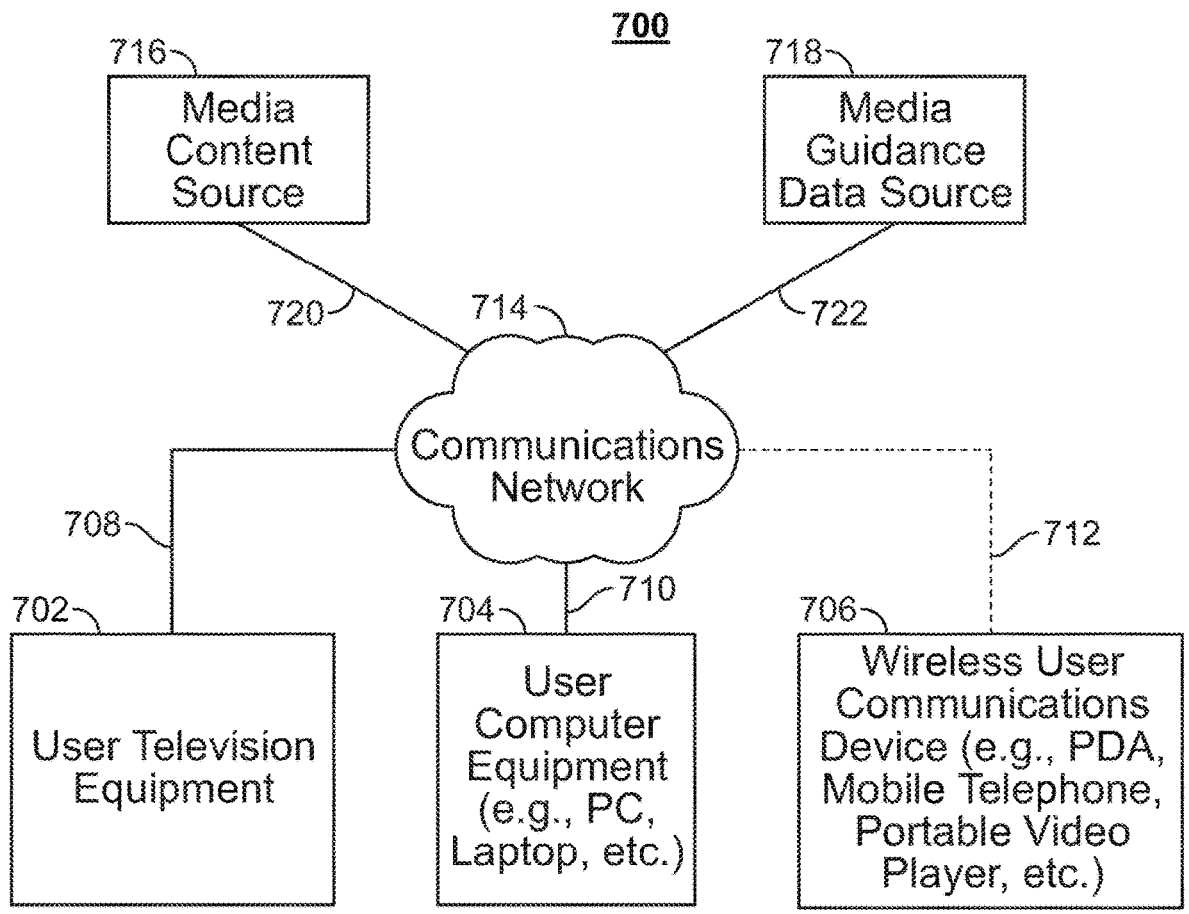
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
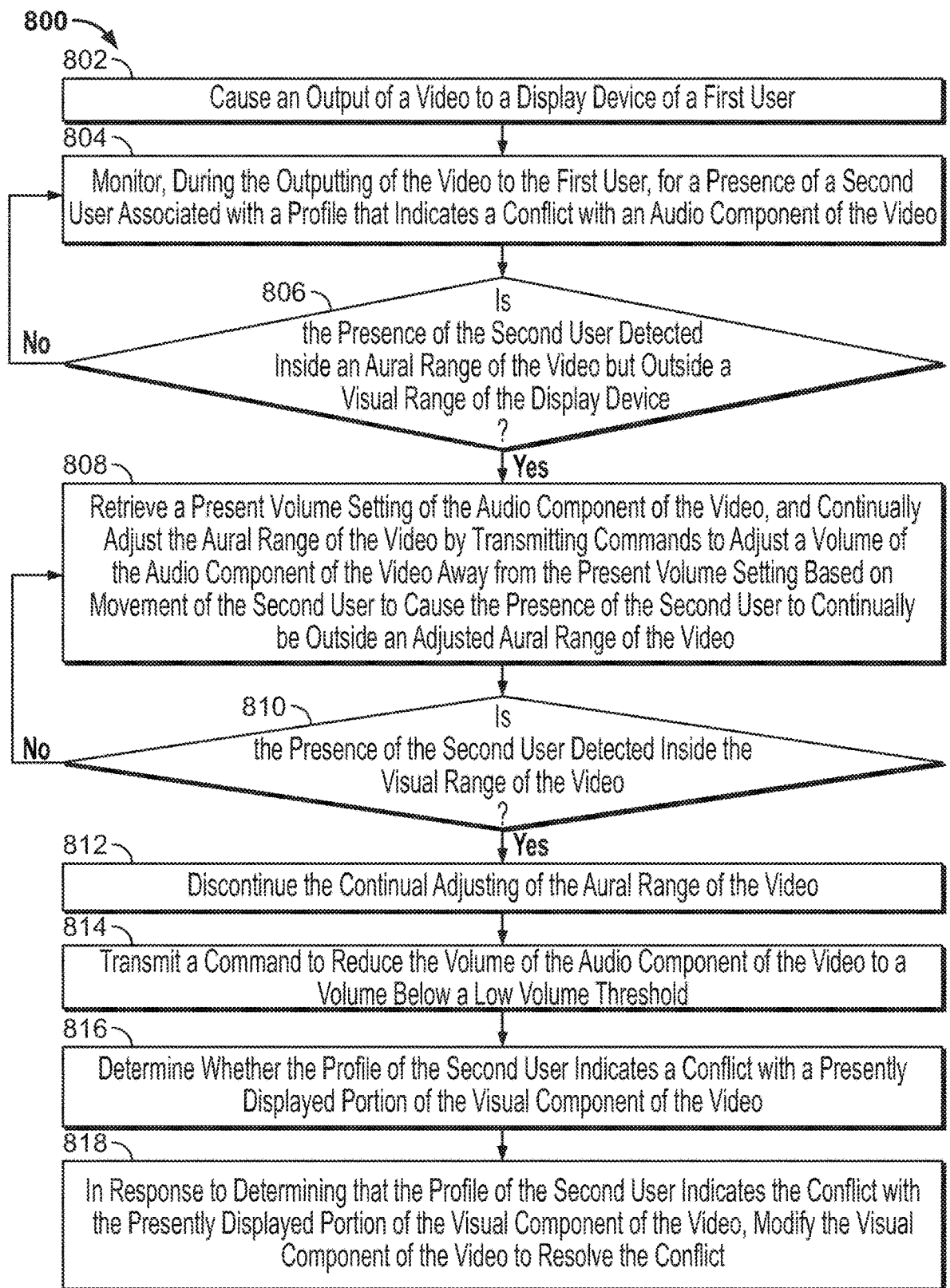
FIG. 8 depicts an illustrative flowchart of a process for transitioning from aural conflict avoidance to visual conflict avoidance, in accordance with some embodiments of the disclosure.

FIG. 8 depicts an illustrative flowchart of a process for transitioning from aural conflict avoidance to visual conflict avoidance, in accordance with some embodiments of the disclosure. Process 800 may be executed by control circuitry 604 (e.g., in a manner instructed to control circuitry 604 by the media guidance application). Control circuitry 604 may be part of user equipment (e.g., user equipment 106, user equipment 200, and/or user equipment 300, each of which may have any or all of the functionality of user television equipment 702, user computer equipment 704, and/or wireless communications device 706), or of a remote server separated from the user equipment by way of communications network 714.

Process 800 begins at 802, where control circuitry 604 causes an output of a video to a display device of a first user (e.g., user equipment 106). Control circuitry 604 may output the visual component of the video by way of display 612, and may output the audio component of the video by way of speakers 614. The video may be received from media content source 716, by way of communications network 714. Alternatively, the video may be retrieved from storage 608 of user equipment 106 or of other user equipment.

At 804, control circuitry 604 may monitor, during the outputting of the video to the first user, for a presence of a second user associated with a profile that indicates a conflict with an audio component of the video. For example, control circuitry 604 may monitor a position of the second user (e.g., monitor whether the second user is at any of position 110, position 112, position 114, or position 116 at any given point of time). Control circuitry 604, when performing the monitoring, may factor in data received from user input interface 610. At 806, control circuitry 604 may determine whether the presence of the second user is detected inside the aural range of the video but outside a visual range of the display device (e.g., user equipment 106). Manners of determining a user's ability to hear or see a visual and/or audio component of the video are described above and are equally applicable to process 800. If control circuitry 604 determines that the second user is not inside the aural range of the video but outside the visual range of the display device, process 800 reverts to 804, where control circuitry continues to monitor for a presence of the second user.

If control circuitry 604 determines that the second user is inside the aural range of the video but outside the visual range of the display device, process 800 continues to 808. At 808, control circuitry 604 continually adjusts the aural range of the video based on movement of the second user (e.g., from position 112 to position 114, as described above with respect to FIG. 1) to cause the presence of the second user to be outside an adjusted aural range of the video. For example, as the second user moves from position 112 toward position 114, the second user is increasingly able to hear the audio component of the video playing on user equipment 106. Thus, the volume is adjusted downward to prevent the user from hearing the audio component.

At 810, control circuitry 604 determines whether the presence of the second user is detected inside the visual range of the video. If the presence is not detected inside the visual range of the video (and, optionally, if the user has not left aural range of the video entirely), process 800 reverts to 808, where movement of the user is continued to be monitored and volume is adjusted accordingly. If, at 810, however, the presence of the second user is detected inside the visual range of the video (e.g., by way of an infrared link being established between a device held by the second user and an infrared port at user equipment 106), process 800 continues to 812.

At 812, control circuitry 604 optionally discontinues the continual adjusting of the aural range of the video, and at 814, control circuitry 604 optionally reduces a volume of the audio component of the video to a volume below a low volume threshold. For example, to save resources, rather than continually adjusting the aural range of the video, control circuitry 604 simply causes the volume of the video to be muted.

At 816, control circuitry 604 determines determine whether the profile of the second user indicates a conflict with a presently displayed portion of the visual component of the video (e.g., a portion of the violent movie playing on user equipment 200). This determination is described in further detail with respect to process 900, described below, as well as FIGS. 1-3 above. At 818, in response to determining that the profile of the second user indicates the conflict with the presently displayed portion of the visual component of the video, control circuitry 604 may modify the visual component of the video to resolve the conflict. The manner in which control circuitry 604 modifies the visual component of the video to resolve the conflict is described in further detail with respect to FIG. 10 below, as well as FIGS. 1-3 above.

Figure 9:
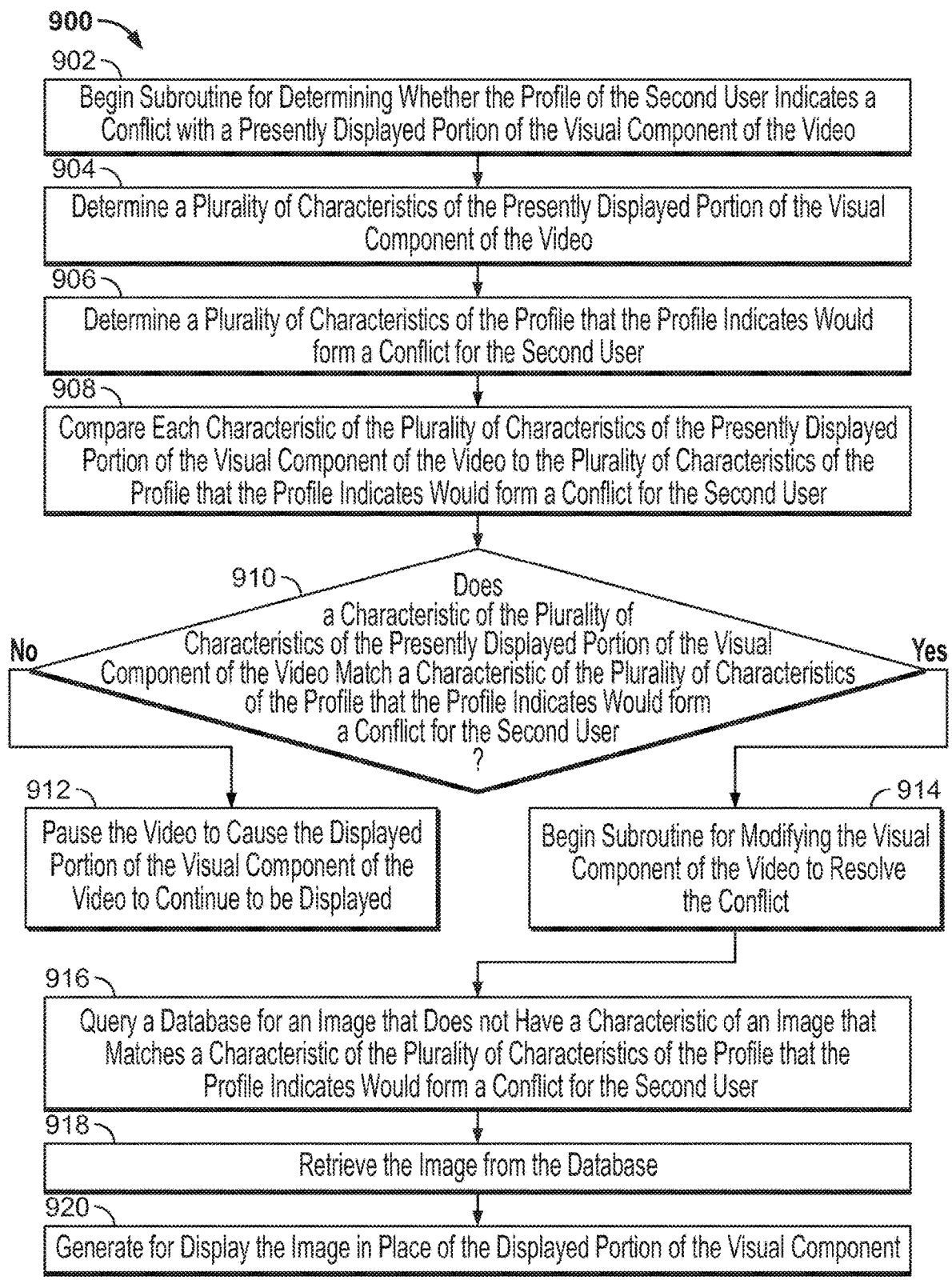
FIG. 9 depicts an illustrative flowchart of a process for avoiding presenting an image to a user if that image forms a conflict with preferences relating to the user, in accordance with some embodiments of the disclosure.

FIG. 9 depicts an illustrative flowchart of a process for avoiding presenting an image to a user if that image forms a conflict with preferences relating to the user, in accordance with some embodiments of the disclosure. Process 900 begins at 902, where control circuitry 604 begins a subroutine for determining whether the profile of the second user indicates a conflict with a presently displayed portion of the visual component of the video (e.g., a subroutine for executing 816 of process 800).

At 904, control circuitry 604 determines a plurality of characteristics of the presently displayed portion of the visual component of the video. As discussed with respect to FIGS. 1-3 above, control circuitry 604 may perform this determination on any basis, such as based on metadata received with the video from a data source, such as media guidance data source 718, by way of communications network 714.

At 906, control circuitry 604 determines determine a plurality of characteristics of the profile that the profile indicates would form a conflict for the second user. Control circuitry 604 may retrieve the profile, and/or information of the profile, from media guidance data source 718, and may determine the plurality of characteristics in any manner described above with respect to FIGS. 1-3. At 908, control circuitry 604 compares each characteristic of the plurality of characteristics of the presently displayed portion of the visual component of the video to the plurality of characteristics of the profile that the profile indicates would form a conflict for the second user. This comparison may be performed in any manner described above with respect to FIGS. 1-3.

At 910, control circuitry 604 determines whether a characteristic of the plurality of characteristics of the presently displayed portion of the visual component of the video matches a characteristic of the plurality of characteristics of the profile that the profile indicates would form a conflict for the second user. If control circuitry 604 determines that there is no match, process 800 continues to 912, where control circuitry 604 pauses the video to cause the displayed portion of the visual component of the video to continue to be displayed. If, however, there is a match, and a conflict exists, process 900 continues to 914, where control circuitry begins a subroutine for modifying the visual component of the video to resolve the conflict.

Process 900 continues to 916, where control circuitry 604 queries a database (e.g., media guidance data source 718) for an image that does not have a characteristic of an image that matches a characteristic of the plurality of characteristics of the profile that the profile indicates would form a conflict for the second user. At 918, control circuitry 604 retrieves the image from the database, and at 920, control circuitry 604 generates for display the image in place of the displayed portion of the visual component. Further details on how the visual component of the video is modified to resolve the conflict are described above with respect to FIGS. 1-3.

Figure 10:
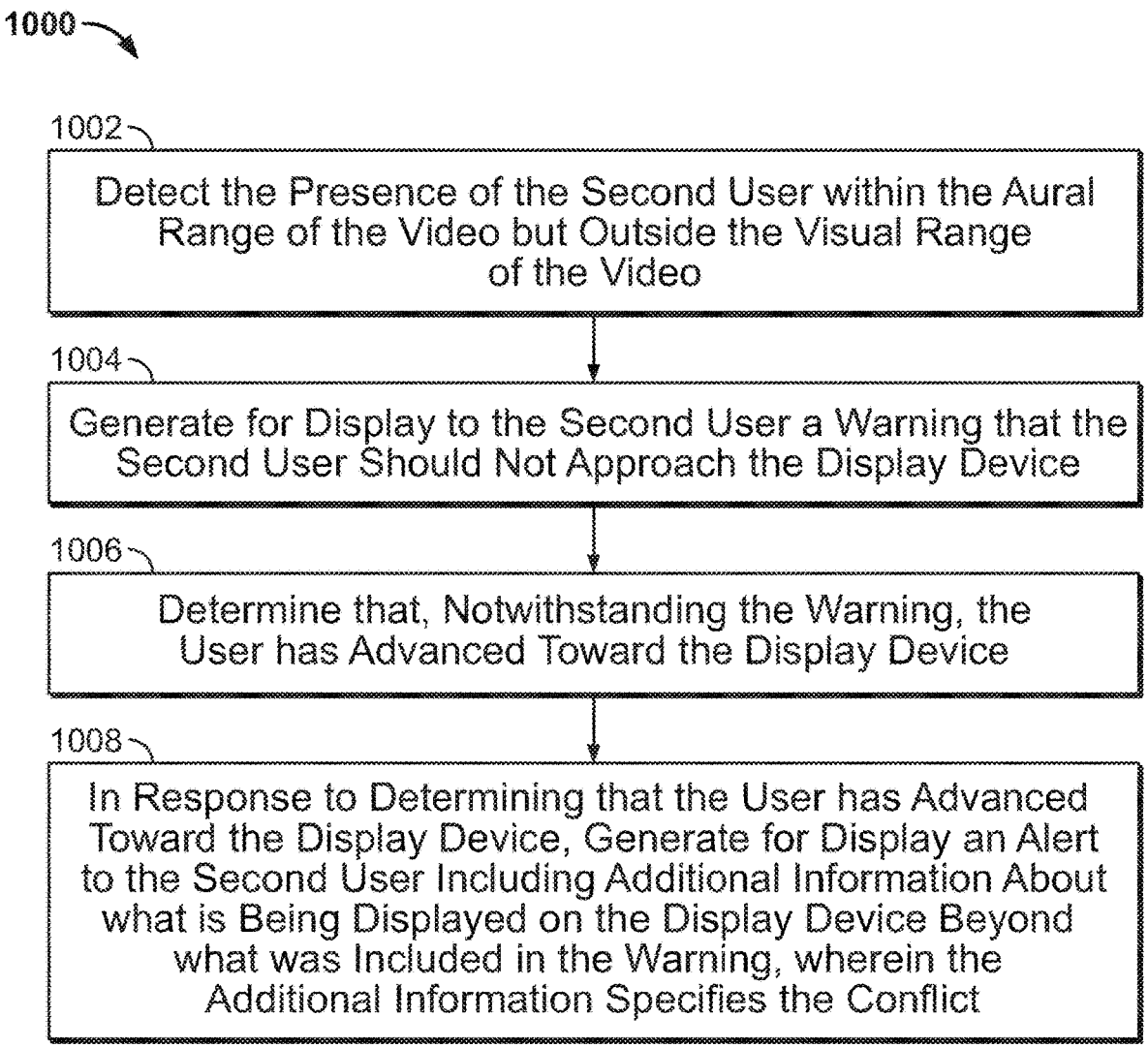
FIG. 10 depicts an illustrative flowchart of a process for warning a user that the user is approaching user equipment displaying a video that forms a conflict with preferences relating to the user, in accordance with some embodiments of the disclosure.

FIG. 10 depicts an illustrative flowchart of a process for warning a user that the user is approaching user equipment displaying a video that forms a conflict with preferences relating to the user, in accordance with some embodiments of the disclosure. Process 1000 begins at 1002, where control circuitry 604 detects the presence of the second user within the aural range of the video but outside the visual range of the video (e.g., as described above with respect to FIG. 1). At 1004, control circuitry 604 generates for display to the second user a warning that the second user should not approach the display device (e.g., alert 302, including location identifier 304).

Process 1000 may continue to 1006, where control circuitry 604 determines that, notwithstanding the warning, the second user has advanced toward the display device (e.g., toward user equipment 106). For example, control circuitry 604 may determine that the second user has advanced from position 112 to position 114. At 1008, in response to determining that the user has advanced toward the display device, control circuitry 604 may generate for display an alert to the second user including additional information about what is being displayed on the display device beyond what was included in the warning, where the additional information specifies the conflict. For example, control circuitry 604 may generate for display alert 302, but may supplement it with topic 306 and/or an identification of first person 308.

Figure 11:
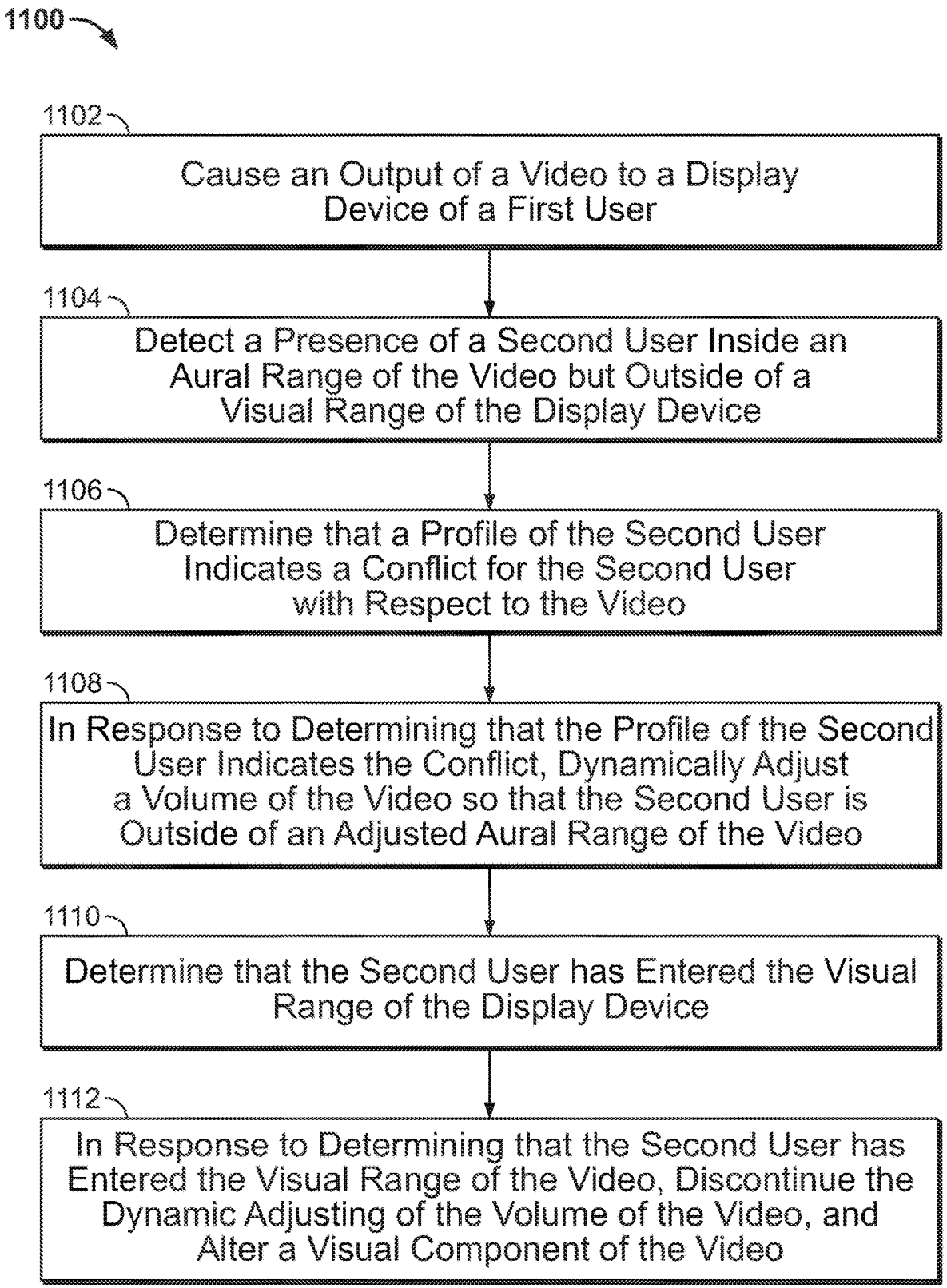
FIG. 11 depicts an illustrative flowchart of a process for transitioning from aural conflict avoidance to visual conflict avoidance, in accordance with some embodiments of the disclosure.

FIG. 11 depicts an illustrative flowchart of a process for transitioning from aural conflict avoidance to visual conflict avoidance, in accordance with some embodiments of the disclosure. Process 1100 begins at 1102, where control circuitry 604 causes an output of a video to a display device of a first user (e.g., user equipment 106). Control circuitry 604 may output the visual component of the video by way of display 612, and may output the audio component of the video by way of speakers 614. The video may be received from media content source 716, by way of communications network 714. Alternatively, the video may be retrieved from storage 608 of user equipment 106 or of other user equipment.

At 1104, control circuitry 604 detects a presence of a second user inside an aural range of the video but outside of a visual range of the display device (e.g., user equipment 106). This detection may be performed in any manner described above. At 1106, control circuitry 604 determines that the profile of the second user indicates a conflict for the second user with respect to the video. Control circuitry 604 may access the profile from media guidance data source 718 or from storage 608, and may determine whether a conflict exists using any manner described above.

At 1108, control circuitry 604, in response to determining that the profile of the second user indicates the conflict, dynamically adjust a volume of the video so that the second user is outside of an adjusted aural range of the video. For example, as described above with respect to process 800, control circuitry 604 may continually calculate a volume that the second user is barely able to hear, and may adjust the volume of the video to be just below that volume that the second user is barely able to hear.

At 1110, control circuitry 604 determines that the second user has entered the visual range of the display device. At 1112, in response to determining that the second user has entered the visual range of the video, control circuitry 604 discontinues the dynamic adjusting of the volume of the video, and alters a visual component of the video (e.g., in the manner described above with respect to FIG. 9, or in any other manner described above).

It should be noted that processes 800-1100 or any step thereof could be performed on, or provided by, any of the devices shown in FIGS. 1-3 and 6-7. For example, any of processes 800-1100 may be executed by control circuitry 604 (FIG. 6) as instructed by control circuitry implemented on user equipment 702, 704, 706 (FIG. 7), and/or a user equipment for selecting a recommendation. In addition, one or more steps of processes 800-1100 may be incorporated into or combined with one or more steps of any other process or embodiment.

It is contemplated that the steps or descriptions of each of FIGS. 8-11 may be used with any other embodiment of this disclosure. In addition, the steps and descriptions described in relation to FIGS. 8-11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 and 6-7 could be used to perform one or more of the steps in FIGS. 8-11.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a position (e.g., position 112) of a user may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 600, media content source 716, or media guidance data source 718. For example, a profile, as described herein, may be stored in, and retrieved from, storage 608 of FIG. 6, or media guidance data source 718 of FIG. 7. Furthermore, processing circuitry, or a computer program, may update settings of user equipment 106, such as volume settings, stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
    detecting a presence of a second user while video is output for display at a device;
    determining a plurality of characteristics of a profile of the second user that indicates a conflict with a presently displayed portion of a visual component of the video;
    determining a plurality of characteristics of the presently displayed portion of the visual component of the video;
    comparing one or more characteristics of the plurality of characteristics of the profile of the second user with one or more characteristics of the plurality of characteristics of the presently displayed portion of the visual component of the video; and
    based at least in part on determining that at least one characteristic of the plurality of characteristics of the profile of the second user matches at least one characteristic of the presently displayed portion of the visual component of the video:
        causing output to the second user of a warning that the second user should not approach the device; and
        causing the presently displayed portion of the visual component of the video to be replaced, at the device, with an image that does not indicate a conflict for the second user.

2. The method of claim 1, wherein causing the presently displayed portion of the visual component of the video to be replaced with the image comprises:
    querying a database for an image that does not have a characteristic of an image that matches a characteristic of the plurality of characteristics of the profile of the second user that indicates a conflict for the second user;
    retrieving the image from the database; and
    generating for display the image in place of the presently displayed portion of the visual component of the video.

3. The method of claim 1, wherein the detecting the presence of the second user comprises:
    detecting that the second user has entered an aural range of the video based on feedback from a sensor;
    determining an identity of the second user; and
    accessing the profile of the second user by querying a database of profiles for an entry that matches the identity of the second user.

4. The method of claim 3, wherein detecting the presence of the second user further comprises:
    determining a volume of the video;
    determining a location of a physical obstruction to a transmission of an audio component of the video;

estimating a distance that the audio component of the video will travel based on the determined volume and based on the location of the physical obstruction; and assigning the estimated distance to be the aural range.

5. The method of claim 4, further comprising:

determining the identity of the second user by either querying a device of the second user or based on a detection of a characteristic of the second user;

in response to determining the identity of the second user, transmitting an alert to a device of a first user that specifies the presence of the second user, and names the identity of the second user;

receiving, in connection with the alert, a command from the first user to discontinue playback of the video; and in response to receiving the command from the first user, discontinuing causing the outputting of the video.

6. The method of claim 1, further comprising:

in response to determining that no characteristic of the plurality of characteristics of the profile of the second user matches any characteristic of the presently displayed portion of the visual component of the video, pausing the video to cause the presently displayed portion of the visual component of the video to continue to be displayed.

7. The method of claim 1, wherein the device is a first device, and the warning that the second user should not approach the device is output at a second device of the second user:

based at least in part on detecting the presence of the second user within an aural range of the video but outside a visual range of the video; and by generating, for display at the second device, to the second user the warning that the second user should not approach the device.

8. The method of claim 1, further comprising:

in response to detecting the presence of the second user within an aural range of the video but outside a visual range of the video, retrieving a present volume setting of an audio component of the video, and continually adjusting the aural range of the video by transmitting commands to adjust a volume of the audio component of the video away from the present volume setting based on movement of the second user to cause the presence of the second user to continually be outside an adjusted aural range of the video.

9. The method of claim 1, wherein characteristics of the profile of the second user, used to detect the presence of the second user, include at least one of facial characteristics, height characteristics, weight characteristics, or voice characteristics.

10. The method of claim 1, wherein the conflict with the presently displayed portion of the visual component of the video comprises an existence of settings, associated with the profile of the second user, that indicates a preference for the second user to not view the visual component of the video.

11. A system comprising:

a memory; and a control circuitry configured to:

detect a presence of a second user while video is output for display at a device;

determine a plurality of characteristics of a profile of the second user that indicates a conflict with a presently displayed portion of a visual component of the video, wherein the profile of the second user is stored in the memory;

determine a plurality of characteristics of the presently displayed portion of the visual component of the video;

compare one or more characteristics of the plurality of characteristics of the profile of the second user with one or more characteristics of the plurality of characteristics of the presently displayed portion of the visual component of the video; and based at least in part on determining that at least one characteristic of the plurality of characteristics of the profile of the second user matches at least one characteristic of the presently displayed portion of the visual component of the video:

cause output to the second user of a warning that the second user should not approach the device; and cause the presently displayed portion of the visual component of the video to be replaced, at the device, with an image that does not indicate a conflict for the second user.

12. The system of claim 11, wherein the control circuitry is configured to cause the presently displayed portion of the visual component of the video to be replaced with the image by:

querying a database for an image that does not have a characteristic of an image that matches a characteristic of the plurality of characteristics of the profile of the second user that indicates a conflict for the second user;

retrieving the image from the database; and generating for display the image in place of the presently displayed portion of the visual component of the video.

13. The system of claim 11, wherein the control circuitry is configured to detect the presence of the second user by:

detecting that the second user has entered an aural range of the video based on feedback from a sensor;

determining an identity of the second user; and accessing the profile of the second user by querying a database of profiles for an entry that matches the identity of the second user.

14. The system of claim 13, wherein the control circuitry is configured to detect the presence of the second user further by:

determining a volume of the video;

determining a location of a physical obstruction to a transmission of an audio component of the video;

estimating a distance that the audio component of the video will travel based on the determined volume and based on the location of the physical obstruction; and assigning the estimated distance to be the aural range.

15. The system of claim 14, wherein the control circuitry is further configured to:

determine the identity of the second user by either querying a device of the second user or based on a detection of a characteristic of the second user;

in response to determining the identity of the second user, transmit an alert to a device of a first user that specifies the presence of the second user, and names the identity of the second user;

receive, in connection with the alert, a command from the first user to discontinue playback of the video; and in response to receiving the command from the first user, discontinue causing the outputting of the video.

16. The system of claim 11, wherein the control circuitry is further configured to:

in response to determining that no characteristic of the plurality of characteristics of the profile of the second user matches any characteristic of the presently displayed portion of the visual component of the video, pause the video to cause the presently displayed portion of the visual component of the video to continue to be displayed.

17. The system of claim 11, wherein the device is a first device, and the control circuitry is further configured to output, at a second device of the second user, the warning based at least in part by:
   detecting the presence of the second user within an aural range of the video but outside a visual range of the video; and
   generating, for display at the second device, to the second user the warning that the second user should not approach the device.

18. The system of claim 11, wherein the control circuitry is further configured to:
   in response to detecting the presence of the second user within an aural range of the video but outside a visual range of the video, retrieve a present volume setting of an audio component of the video, and continually adjust the aural range of the video by transmitting commands to adjust a volume of the audio component of the video away from the present volume setting based on movement of the second user to cause the presence of the second user to continually be outside an adjusted aural range of the video.

19. The system of claim 11, wherein characteristics of the profile of the second user, used to detect the presence of the second user, include at least one of facial characteristics, height characteristics, weight characteristics, or voice characteristics.

20. The system of claim 11, wherein the conflict with the presently displayed portion of the visual component of the video comprises an existence of settings, associated with the profile of the second user, that indicates a preference for the second user to not view the visual component of the video.

* * * * *